(12) United States Patent
Komarek et al.

(10) Patent No.: US 11,761,863 B2
(45) Date of Patent: *Sep. 19, 2023

(54) SYSTEMS AND METHODS FOR EXTRACTING ANALYTES FROM A SAMPLE

(71) Applicant: ANKOM Technology Corporation, Macedon, NY (US)

(72) Inventors: Andrew R. Komarek, Fairport, NY (US); Richard Giannetti, Fairport, NY (US); Michael Drew Komarek, Webster, NY (US); Ronald J. Komarek, Fairport, NY (US); Ryan J. Komarek, Penfield, NY (US); Steven T. Lauffer, Macedon, NY (US); Marleen van Aardt, Fairport, NY (US)

(73) Assignee: ANKOM Technology Corporation, Macedon, NY (US)

( * ) Notice: Subject to any disclaimer, the term of this patent is extended or adjusted under 35 U.S.C. 154(b) by 172 days.

This patent is subject to a terminal disclaimer.

(21) Appl. No.: 17/240,442

(22) Filed: Apr. 26, 2021

(65) Prior Publication Data

US 2021/0278326 A1    Sep. 9, 2021

Related U.S. Application Data

(63) Continuation of application No. 16/977,717, filed as application No. PCT/US2020/030369 on Apr. 29, 2020, now Pat. No. 10,989,634.

(Continued)

(51) Int. Cl.
*G01N 1/40* (2006.01)
*G01N 1/38* (2006.01)
(Continued)

(52) U.S. Cl.
CPC ............... *G01N 1/38* (2013.01); *B01B 1/005* (2013.01); *B01D 11/0434* (2013.01);
(Continued)

(58) Field of Classification Search
None
See application file for complete search history.

(56) References Cited

U.S. PATENT DOCUMENTS 3,772,325 A * 11/1973 Epstein et al. ....... C07D 209/70
548/358.5
6,177,008 B1    1/2001 Treiber
(Continued)

FOREIGN PATENT DOCUMENTS

WO    2018/026886 A1    2/2018
WO    2019/018874 A1    1/2019

OTHER PUBLICATIONS

International Search Report and Written Opinion; International Application No. PCT/US20/30369; dated Jul. 10, 2020 and dated Aug. 4, 2020, 6 pages.

(Continued)

*Primary Examiner* — Daniel S Larkin
(74) *Attorney, Agent, or Firm* — Barclay Damon LLP

(57) ABSTRACT

Systems and methods for extracting an analyte from a sample. The system includes a reaction vessel for receiving the sample and a reaction solution, a mixer for mixing the sample with the reaction solution, a filter and a drain for passing soluble components from the reaction mixture, including the dissolved analyte, from the reaction vessel. A purification vessel is located below the reaction vessel. A selective sorbent is disposed in the purification vessel for retaining contaminants from the soluble components from the reaction mixture and passing a purified analyte. An evaporation container is located below the purification ves- (Continued)

sel. A heater heats the evaporation chamber and evaporates the solvents from the purified analyte, which can then be quantitatively measured.

20 Claims, 6 Drawing Sheets

Related U.S. Application Data

(60) Provisional application No. 62/840,110, filed on Apr. 29, 2019.

(51) Int. Cl.
 *B01B 1/00* (2006.01)
 *B01D 11/04* (2006.01)
 *B01J 20/14* (2006.01)

(52) U.S. Cl.
 CPC .............. *B01J 20/14* (2013.01); *G01N 1/405* (2013.01); *G01N 1/4022* (2013.01); *G01N 1/4077* (2013.01); *B01J 2219/00495* (2013.01); *G01N 2001/386* (2013.01); *G01N 2001/4027* (2013.01); *G01N 2001/4088* (2013.01)

(56) References Cited

U.S. PATENT DOCUMENTS

| | | | |
|---|---|---|---|
| 6,482,363 B1 | 11/2002 | Dobelin | ............... B01J 19/0046 |
| | | | 366/177.1 |
| 7,087,437 B2 | 8/2006 | Wohleb | |
| 9,182,382 B2 | 11/2015 | Komarek | ................. C12Q 1/40 |
| 2005/0037386 A1 | 2/2005 | Morrison et al. | |
| 2005/0142219 A1* | 6/2005 | Dunuwila | ............... A23L 27/45 |
| | | | 424/722 |
| 2013/0233093 A1 | 9/2013 | Pohl et al. | |
| 2014/0017672 A1 | 1/2014 | Holmberg | |
| 2014/0151224 A1 | 7/2014 | Glezer et al. | |
| 2016/0346712 A1 | 12/2016 | Fatemi | ..................... G01N 1/40 |
| 2019/0011338 A1* | 1/2019 | Collins, Sr. | .......... G01N 35/026 |

OTHER PUBLICATIONS

European Patent Office; Extended European Search Report; Application No. 20798655.5; dated Jan. 3, 2023; Date of Completion: Dec. 9, 2022; 6 pages.

* cited by examiner

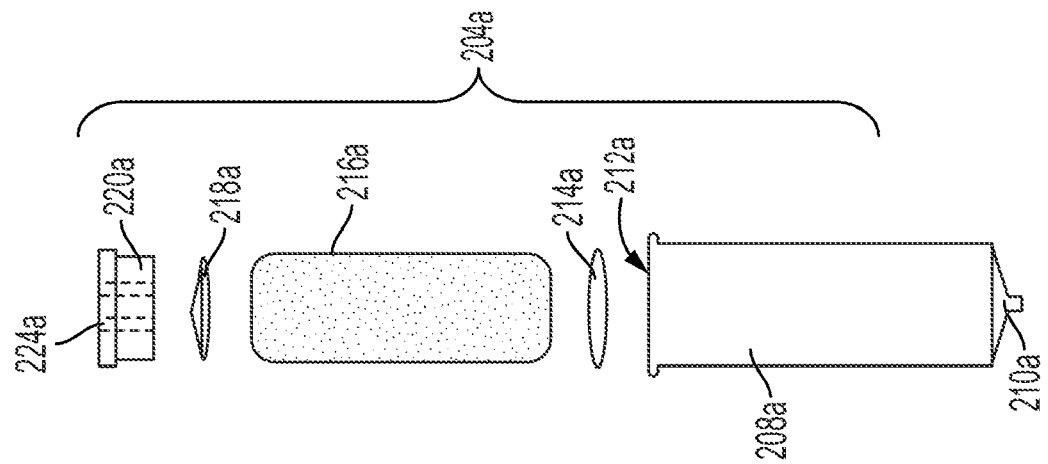
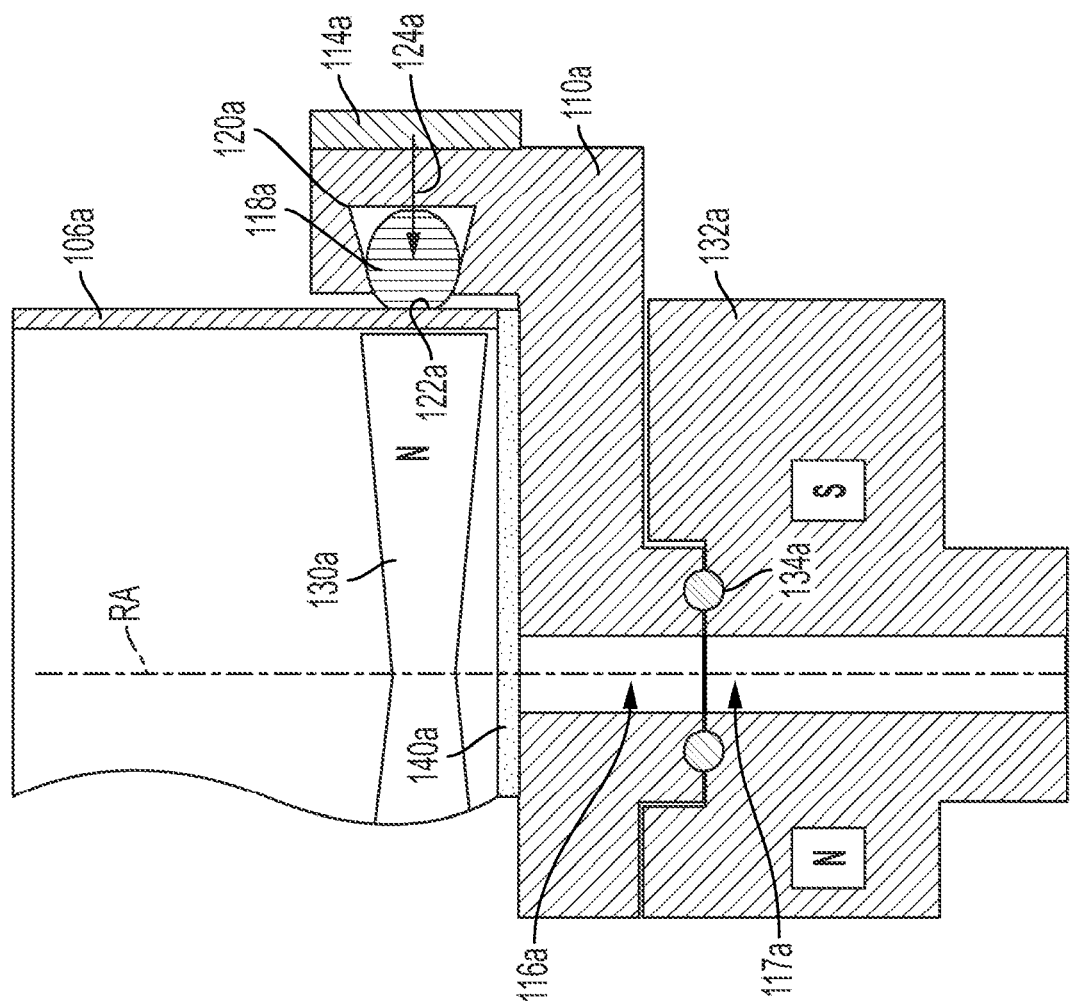

SYSTEMS AND METHODS FOR EXTRACTING ANALYTES FROM A SAMPLE

CROSS-REFERENCE TO RELATED APPLICATIONS

This application is a continuing application of U.S. National Patent Application Ser. No.: Ser. No. 16/977,717, now U.S. Pat. No. 10,989,634, entitled "SYSTEMS AND METHODS FOR EXTRACTING ANALYTES FROM A SAMPLE" and filed Sep. 2, 2020, which is a 371 National Application of PCT International Application No.: PCT/US2020/030369, filed Apr. 29, 2020, which further claims priority to a U.S. Provisional Patent Application Ser. No. 62/840,110 filed Apr. 29, 2019 entitled "INSTRUMENT AND METHOD FOR ISOLATION OF ANALYTES THROUGH RELEASE, EXTRACTION, PURIFICATION, AND CONCENTRATION". The contents of the aforementioned applications are hereby incorporated by reference in their entirety.

TECHNICAL FIELD

The present invention is directed to systems and methods that perform various chemical and physical operations resulting in the automated extraction of an analyte in preparation for quantitative measurement.

BACKGROUND

The extraction (i.e., isolation) and quantitation of certain nutrients from complex matrices can be challenging, particularly from natural sources. In the early 1900s the government started mandating testing of foods through the Pure Food and Drug Act. More recently, with the advent of the 1990 Nutrient Labeling and Education Act (NLEA), the Food and Drug Administration has required food manufacturers to provide nutrient information to consumers. Such nutrient information is provided in the form of a nutrition label on all packaged foods. As a consequence of the NLEA, food manufacturers are required to analyze their products so that accurate information about the nutrient content can be provided to customers.

Analysis of any food or feed product requires several initial or preliminary processes designed to chemically release, purify, and concentrate target analytes (select nutrients) from the physical and chemical matrices of the product. That is, before the analyte can be identified and quantitated by high performance liquid chromatography (HPLC) or gas chromatography (GC), the hydrogen, ionic and/or covalent bonds which bind the analyte to its physical and/or chemical matrix must be broken and sufficient quantities must be collected.

Historically, these analytical processes have been performed manually in an analytical laboratory by skilled laboratory technicians. More specifically, these processes have been performed to quantitatively extract analytes, such as fat soluble vitamins (FSVs), leading to final quantitation by either spectrophotometry or more recently HPLC. FSVs must be extracted in a non-polar solvent fraction that is free from water soluble compounds and most lipids. For example, the analysis of retinol (Vitamin A) most commonly involves: (i) the cleavage of ester linkages through saponification, (ii) removal of water-soluble compounds and extraction of the analyte by bi-phase separation, and (iii) concentration of the resultant analyte by evaporation of the solvent. The analysis is complicated by a requirement to conduct each step without exposure to selective wavelengths of light and in the absence of oxygen.

Other major impediments to the analysis are formation of emulsions during bi-phase separations. Emulsions effectively forms a third phase that is hard to separate and which prohibits complete extraction of the analyte. Most emulsions will settle over time. If emulsions are persistent, an additional step, such as centrifugation or re-extraction, may be needed to break the emulsion and fully extract the analyte. These are costly analytical steps.

Another example where several initial or preliminary processes are required to chemically release, purify, and concentrate target analytes is the analysis of total fat. The steps involved includes: (i) hydrolysis in a hydrochloric acid (HCl) solution, (ii) removal of water soluble compounds in a bi-phase separation of an aqueous phase and organic solvent phase (in a Mojonnier flask), and (iii) evaporation of solvent for gravimetric quantitation of isolated fat. In other total fat methods, fat can be captured by oleophilic filters while allowing the aqueous solution to pass through. The residue and filter then must be thoroughly dried before extraction with organic solvents. The drying step removes trace water from the hydrolyzed sample which subsequently enables the non-polar solvent to penetrate the otherwise polar hydrolyzed sample. After extraction, the solvent containing the fat is evaporated and the isolated fat is quantitated gravimetrically. It will be appreciated that these methods are time-consuming, fiscally burdensome, and labor intensive.

In view of the difficulties and complexities of the current methods associated with the extraction of the analytes (e.g., FSV and total fat) there is a need for a self-contained, fully-automated system and method for extracting analytes from complex samples.

SUMMARY

Systems and methods for extracting an analyte from a sample are disclosed. In one embodiment, the system includes a reaction chamber comprising a reaction vessel having a column for receiving the sample and a reaction solution, a mixer for mixing the sample with the reaction solution, a filter and a drain for passing soluble components, including the dissolved analyte, from the reaction vessel.

In one embodiment, a purification chamber is located below the reaction chamber and includes a purification vessel having a column for receiving the dissolved analyte from the reaction vessel. A selective sorbent is disposed in the purification vessel for retaining contaminants from the soluble components from the reaction mixture and passing a purified analyte.

An evaporation chamber is located below the purification chamber comprising an evaporation container for receiving the purified analyte contained in solvent from the purification vessel. A heater heats the evaporation chamber and evaporates the solvents from the purified analyte, which can then be transferred for quantitative measurement.

The above embodiments are exemplary only. Other embodiments are within the scope of the disclosed subject matter.

BRIEF DESCRIPTION OF THE DRAWINGS

A more particular description of the invention briefly summarized above may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Thus, for further understanding of the nature and objects of the invention, references can be made to the following detailed description, read in connection with the drawings in which:

FIG. 5 depicts an enlarged schematic view of a portion of the exemplary reaction vessel;

FIG. 6 depicts a schematic, exploded view of an exemplary purification vessel;

DETAILED DESCRIPTION

The present disclosure is directed to an analyte extractor (or instrument) configured to automatically extract (i.e., isolate) analytes from complex matrices for subsequent quantitative analysis by, e.g., chromatography, spectrophotometry or gravimetric measurement. While the exemplary analyte extractor is principally configured to extract (i.e., isolate) fats and fat-soluble analytes, it should be appreciated that the device is equally applicable to any device having as its principle function, the liberation, extraction, purification and isolation of analytes which must be separated from complex matrices. Furthermore, while the exemplary analyte extractor includes a variety of chambers/vessels/containers/processes, in series, for isolating analytes for subsequent quantitative analysis, it will be appreciated that other embodiments may utilize fewer chambers/vessels/containers/processes to produce samples for further testing. For example, the analyte extractor may not utilize the evaporation chamber to produce an analyte for subsequent analysis. Moreover, while the exemplary instrument includes as many as four assay stations/positions a, b, c, d in parallel, i.e., in juxtaposed relation, for performing extraction processes on four (4) complex samples, it will be appreciated that the analyte extractor may utilize any number of assay stations or positions to extract analyte from samples.

Figure 1:
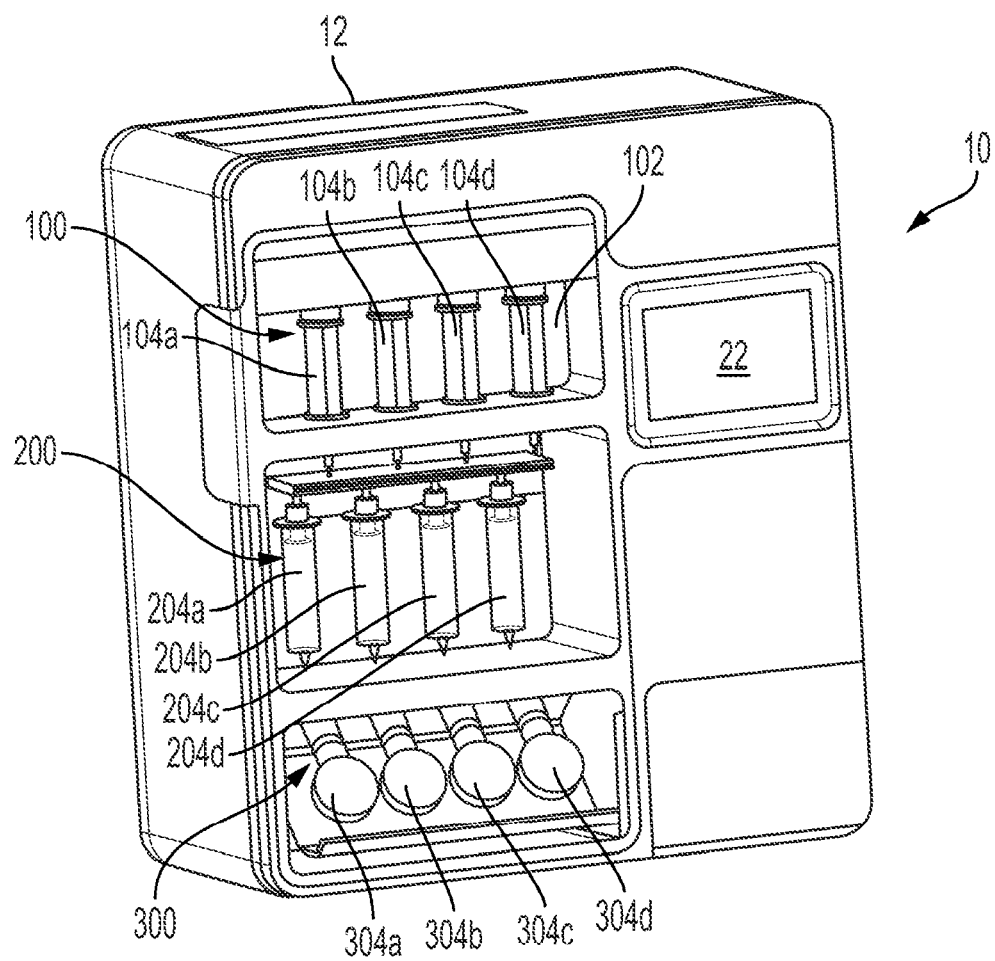
FIG. 1 depicts a perspective view of an exemplary automated system or extractor for extracting analytes for quantitative measurement.

FIG. 1 depicts an exemplary analyte extractor 10 in accordance with the teachings of the present disclosure that includes a body or chassis 12 that allows for the fixed and detachable mounting of various components of the extractor 10. The exemplary analyte extractor 10 comprises a plurality of vertically aligned chambers including a reaction chamber 100, which is located above a purification chamber 200, which is located above an evaporation chamber 300 for mounting one or more like components, i.e., components performing the same or similar operation.

Samples (e.g., food or feedstuff samples) can be deposited into and received by one or more reaction vessels 104a, 104b, 104c, 104d in the reaction chamber 100. As used herein, the term "vessel" generally refers to, e.g., a column, tube, etc. that can contain a fluid and allow the fluid to pass through. As used herein, the term column and tube are used interchangeably. A mixture of various solutions can be added to the samples in the reaction vessels 104a, 104b, 104c, 104d after which agitating (e.g., mixing) can be performed, and heat can be added, to accomplish a first function where a dissolved analyte of the sample is produced in the soluble components of the reaction mixture. The dissolved analyte flows serially down through a filter, to one or more detachable purification vessels (e.g., columns, tubes, etc.) 204a, 204b, 204c, 204d associated with the purification chamber 200 that are vertically aligned along a same axis and below the respective reaction vessels 104a, 104b, 104c, 104d, such that a second operation can be performed to produce a purified analyte contained in solvent. Similarly, the purified analyte contained in solvent in the second row or purification chamber 200 can flow serially down to one or more containers (e.g., flasks) 304a, 304b, 304c, 304d in yet another row associated with the evaporation chamber 300 that are vertically aligned along the same axis and below the respective purification vessels 204a, 204b, 204c, 204d, such that yet another operation can be performed.

In the described embodiment, the analyte extractor 10 may comprise a plurality of columns/stations/lanes a, b, c, d for integrating a plurality of vessels (e.g., columns, tubes, etc.) and containers (e.g., flasks) in parallel. As such, a plurality of samples, corresponding to the number of stations, can be processed simultaneously, vastly increasing throughput. Control inputs to the analyte extractor 10 may be made through a display, command, input or touch screen 22. All variables associated with a method or a process may be input through the display/screen 22. Each of these system components and method steps will be discussed in greater detail in the subsequent paragraphs.

Figure 2:
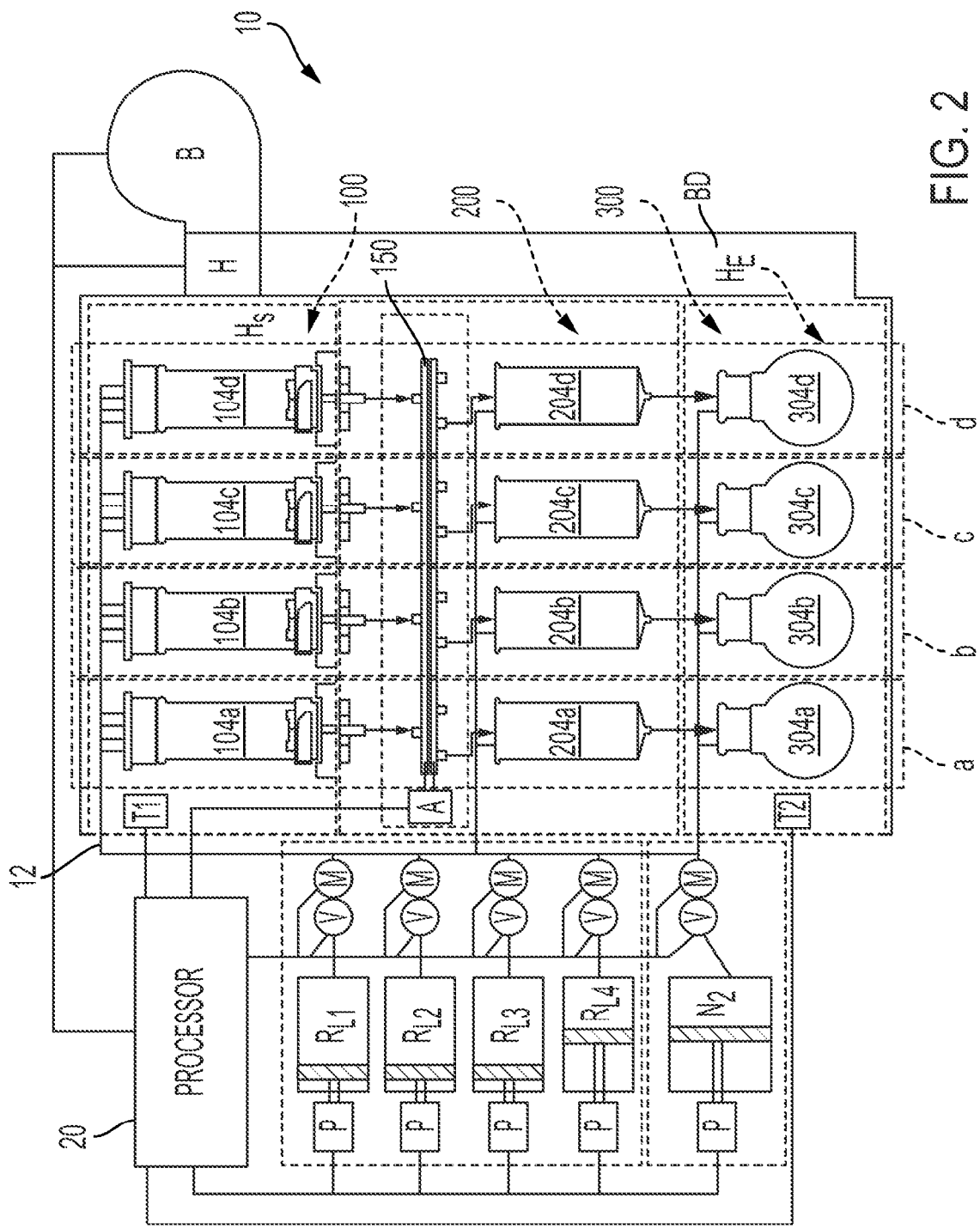
FIG. 2 depicts a schematic, profile view of the exemplary system shown in FIG. 1 including a reaction chamber, a shuttle valve transfer apparatus, a purification chamber, and an evaporation chamber.
Figure 3:
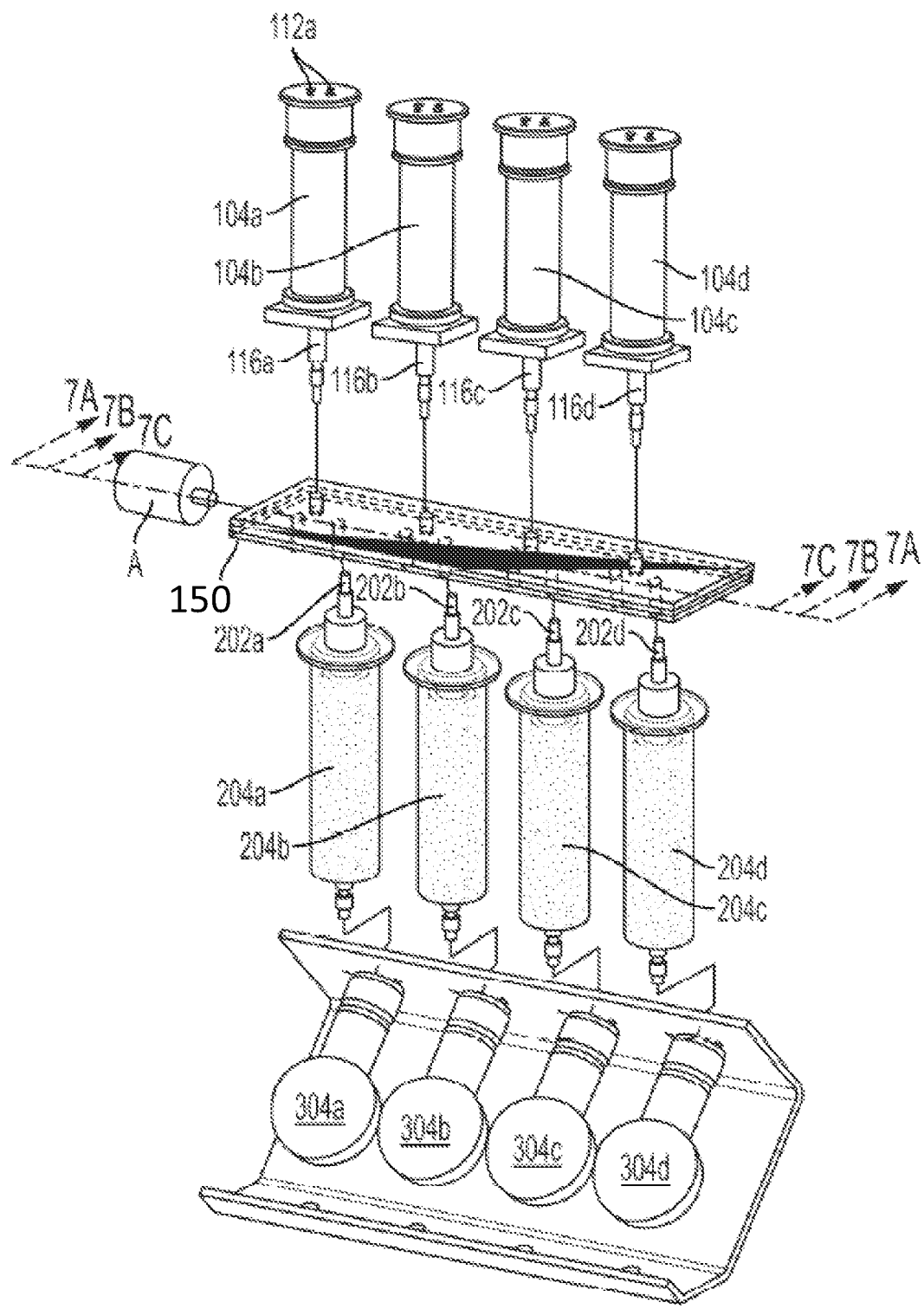
FIG. 3 depicts a perspective view of the exemplary reaction vessels, purification vessels, and evaporation containers in parallel.
Figure 4:
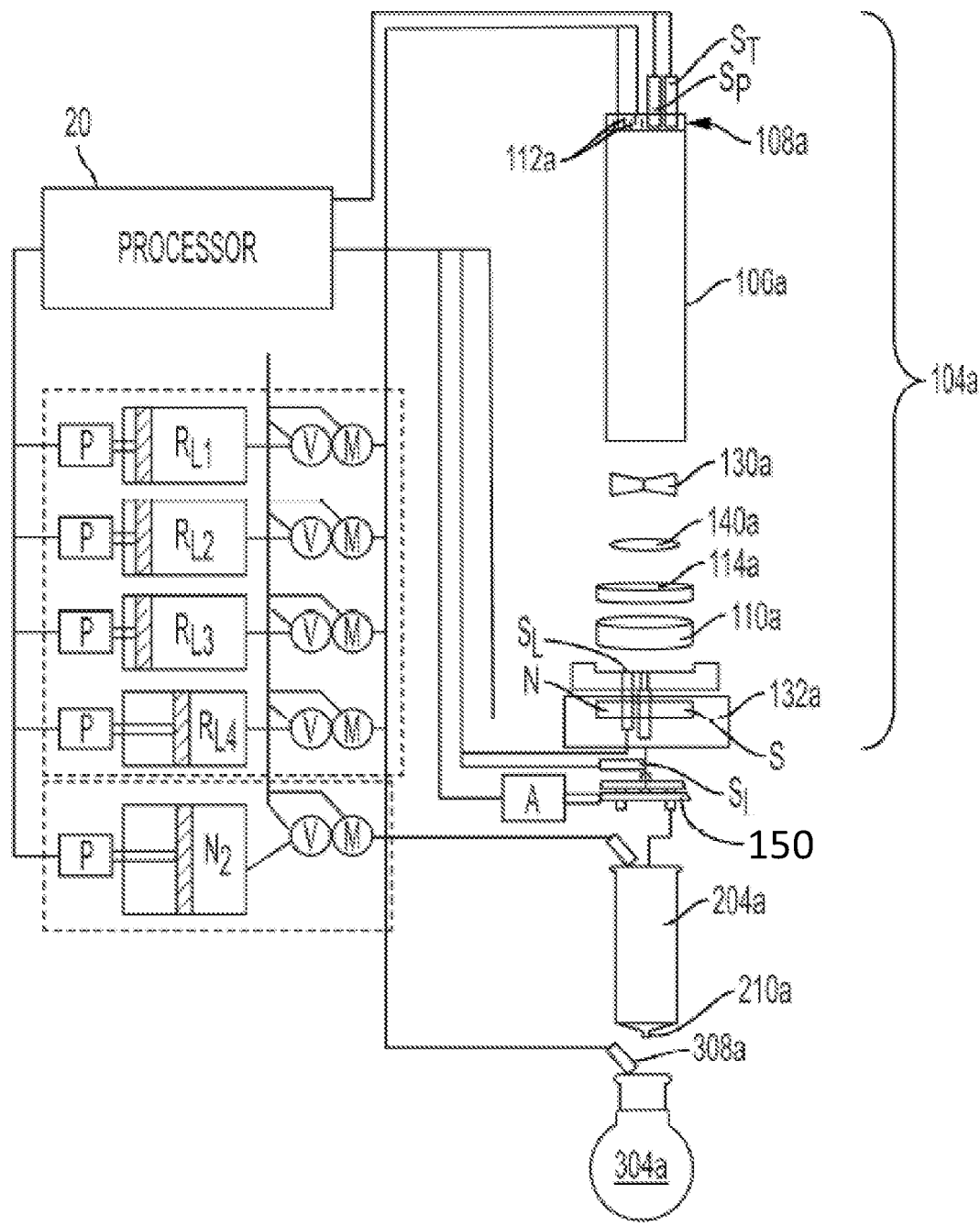
FIG. 4 depicts a schematic, exploded view of the exemplary components associated with a single station of the system, including a reaction chamber, a shuttle valve transfer apparatus, a purification chamber, and an evaporation chamber.

FIGS. 2, 3 and 4 depict detailed schematics of the exemplary analyte extractor 10 of the present disclosure depicting the relevant internal details and components of the instrument. More specifically, pumps P can be associated with valves V and flow meters M to inject a volume of liquid/solution into the reaction vessels 104a, 104b, 104c, 104d of the reaction chamber 100. In one embodiment, a diffusing nozzle can be located at the inlets of the reaction vessels 104a, 104b, 104c, 104d to deflect the pumped solution toward an internal wall of the reaction vessel to wash down and dissolve analyte material disposed along the internal wall of the reaction vessel.

A heater H can be operative to heat the sample/mixture within one or more of the chambers 100, 300 effectively forming an oven in each chamber 100, 300. A blower B can be operative to circulate air within one or more of the chambers 100, 300. One or more temperature sensors T1 and T2 control temperature in chambers 100, 300. Temperature sensors ST may also be provided in, on or integrated with, the reaction vessels 104a, 104b, 104c, 104d to provide temperature feedback in close proximity to, or within, the sample analyte being processed/evaluated.

One or more actuators A may be used to open/close a ganged shuttle valve 150 at appropriate intervals in the analyte extraction process. A plurality of reservoirs $R_{L1}$, $R_{L2}$, $R_{L3}$, $R_{L4}$ and corresponding valves V may be employed for combining the various solutions with the sample within at least the reaction chamber 100. Furthermore, while in the exemplary embodiment, each of the reservoirs $R_{L1}$, $R_{L2}$, $R_{L3}$, $R_{L4}$ includes a valve V, it will be appreciated that a single valve V may be used to control the flow associated with two or more reservoirs $R_{L1}$, $R_{L2}$, $R_{L3}$, $R_{L4}$. A processor 20, such as a microprocessor, can be operative to control all processes within the system. Similarly, while a single processor 20 is shown to control the operations associated with each of the chambers, 100, 200, 300, it will be appreciated that several microprocessors may be employed to control independent functions of the analyte extractor 10. Finally, a power source (not shown) can be used to activate the pumps P, heater H, blower B, valves V, actuator A, temperature sensors ST, T1, and T2, pressure sensor Sp, liquid sensors SL, ganged shuttle valve 150 and processor 20 of the analyte extractor 10. Similarly, the pumps P, valves V, and flow meters M are operatively coupled to the processor 20 such that an accurate flow and quantity of solutions contained in fluid reservoirs $R_{L1}$, $R_{L2}$, $R_{L3}$, $R_{L4}$, may be supplied to the reaction vessels 104a, 104b, 104c, 104d.

Reaction Chamber

The analyte extractor 10 performs a variety of critical operations to isolate the target analytes from the complex sample. In the first process, i.e., in the reaction chamber 100, a sample can be exposed to one or more solutions, while being agitated and heated in an oxygen-free environment. This step releases the target analyte from a complex matrix. Fat soluble vitamin analysis typically releases the vitamins through an ethanolic saponification reaction, while total fat analysis typically releases fat through a HCl hydrolysis reaction. These reactions result in an analyte which can be dissolved in a complex mixture of solutions along with an insoluble residue. This mixture can be filtered before it is passed onto the purification vessels (the second chamber 200 of the analyte extractor or instrument 10).

The reaction vessel 104 has a unique design that allows for the separation of the liquid portion from the insoluble residue. To facilitate the discussion, a single reaction vessel 104a will be described in detail with the understanding that adjacent reaction vessels 104b, 104c, 104d can be essentially identical and do not require or warrant additional description. Hence, when referring to one reaction vessel in the reaction chamber 100 and/or one component associated with the purification and evaporation chambers 200, 300, it should be understood that the vessel or step being described can apply to all of the same components associated with an adjacent assay station. The reaction vessel 104a can be removable so that it can be placed on a balance/scale and sample can be weighed directly into the vessel 104a.

The reaction vessel 104a can be chemically inert and designed to withstand strong acids, bases, and organic solvents at temperatures ranging from, e.g., between 20° C. to 105° C. Prior to reaction, the reaction vessel 104a can be closed (e.g., automatically closed) by lowering a chemically inert reaction vessel cap (i.e., lid, plug, top, etc.) 108a over and enclosing the top opening of the vessel 104a. Each reaction vessel cap 108a may contain temperature and pressure sensors ST, SP, and apertures (i.e., ports, apertures, orifices, etc.) 112a for vent and liquid supply lines. The reaction vessel 104a can be completely sealed, and with feedback from each of these sensors, provide complete control of the internal environment. To protect sensitive analytes, such as vitamin A and E, an oxygen-free environment can be created in the reaction vessel by inserting an inert gas such as nitrogen ($N_2$) gas.

Each reaction vessel 104a can be detachable to facilitate removal, cleaning, sterilization and loading of sample material (not shown). The reaction vessel 104a can comprise a cylindrically shaped reaction vessel column 106a made of, e.g., borosilicate glass, a reaction vessel cap 108a having a plurality of apertures 112a, and a detachable reaction vessel base 110a. It will be understood that the scope of the invention includes reaction vessels 104a having a shape different than a cylindrical column. In addition to receiving temperature and pressure sensors ST, SP, the apertures 112a may receive fluids or vent gases/volatiles from the reaction vessel 104a sample mixture. A liquid sensor SL may be provided through the top or bottom of each vessel or container to ensure that liquids have drained or evaporated from the respective vessel or container. For example, in FIG. 4, the reaction vessel 104a may include a liquid sensor SL through the detachable reaction vessel base 110a to indicate when fluids have drained from the reaction vessel 104a. Alternatively, or additionally, a liquid sensor SL may be disposed in the flexible tubing between the reaction vessel drain (e.g., a drain) 116a and the shuttle valve 150. When the refractive index changes, the liquid sensor SL can determine that liquid is no longer present in the tube, hence, no longer remaining in the reaction vessel 104a.

While the exemplary borosilicate glass reaction vessel column 106a can be configured to be cleaned, sanitized and reused, it will be appreciated that other materials may be employed which are disposable. For example, a transparent polypropylene cylindrical column may be employed with built-in components to facilitate rapid deployment and reuse of a reaction vessel 104a. That is, a disposable reaction vessel 104a may include the reaction vessel cap 108a having apertures 112a for receiving the temperature sensor ST, the pressure sensor Sp, and one or more fluid fill lines. The disposable vessel 104a may also include the reaction vessel base 110a including the mixer driver 132a, mixing stir bar 130a, the requisite reaction vessel filter 140a, and a reaction vessel drain 116a. An O-ring seal may or may not be required inasmuch as other sealing methods may be employed and the reaction vessel base 110a may or may not be detachable.

In the described embodiment, the reaction vessel cap 108a can be fixed to the instrument and be able to apply a downward force to seal the reaction vessel cap 108a, the reaction vessel column 106a, and the detachable reaction vessel base 110a of the reaction vessel 104a. The reaction vessel cap 108a includes at least two apertures 112a disposed in fluid communication with at least one of the fluid reservoirs $R_{L1}$, $R_{L2}$, $R_{L3}$, $R_{L4}$, and at least one supply of nitrogen gas ($N_2$). Nitrogen gas $N_2$ may be injected into the reaction vessel 104a to produce an oxygen-free or oxygen-starved environment. As such, evaporating solvents cannot form a combustible gas inasmuch as the solvent-to-oxygen ratio can be maintained below combustion levels. The back pressure from the nitrogen gas ($N_2$) can also function to facilitate flow of the dissolved analyte through the particulate reaction vessel reaction vessel filter 140a and the reaction vessel drain 116a.

The vessel caps 108a may be fabricated from a plastic. In one embodiment, the plastic can be a polytetrafluoroethylene polymer, commonly known as a Teflon material (Teflon® is a registered Trademark of E.I. du Pont de Nemours and Company, located in Wilmington, State of Delaware). Since the vessel caps 108a are exposed to large temperature variations, i.e., between room temperature to over one-hundred degrees Celsius (100° C.), the effect of thermal expansion must be considered to ensure a gas- and fluid-tight seal with the reaction vessel column 106a. With respect to the reaction vessel cap 108a, an elastomer or rubber O-ring can be sealed between the wall surface of the reaction vessel column 106a and the reaction vessel cap 108a. This arrangement and geometry can improve seal integrity since the sealing interface can be compressed due to the difference in thermal growth, or coefficient of thermal expansion, between the plastic vessel cap 108a and the borosilicate glass reaction vessel column 106a.

FIG. 5 shows a detailed diagram of the reaction vessel base 110a. The reaction vessel base 110a can also be fabricated from a polytetrafluoroethylene polymer or plastic material (e.g., Teflon®). The O-ring seal 118a can be disposed between the outer peripheral surface 122a of the reaction vessel column 106a and the inner wall of the reaction vessel base 110a. Inasmuch as the growth of the plastic reaction vessel base 110a could be greater than the borosilicate glass reaction vessel column 106a, an outer ring or sleeve 114a of reinforcing material may surround the plastic reaction vessel base 110a to restrict its outward growth. The material selected for fabricating the outer ring or sleeve 114a should have a lower coefficient of thermal expansion than the plastic reaction vessel base 110a, and preferably, a similar rate of thermal expansion of the borosilicate glass. In the described embodiment, the outer ring or sleeve 114a can be fabricated from a metal, such as stainless steel. As a consequence, the seal integrity may be maintained or improved by an inwardly directed radial force 124a applied by the metal outer ring 114a. To improve seal integrity yet further, the O-ring seal 118a is received within a groove 120a having a substantially dove-tailed cross-sectional geometry. This configuration captures the O-ring seal 118a as the reaction vessel column 106a slides into, and received within, the cavity of the plastic reaction vessel base 110a. That is, the dove-tail groove 120a maintains the efficacy of the sealing interface along the outer peripheral surface 122a of the reaction vessel column 106a, especially during assembly of the plastic reaction vessel base 110a.

The reaction vessel 104a can include a mixing stir bar 130a and concentric mixer driver 132a, which can be mounted below the reaction vessel base 110a, and operative to mix fluids with the sample in the reaction vessel 104a. More specifically, the mixing system comprises a mixing stir bar 130a and a mixer driver 132a coaxially aligned. The reaction vessel drain 116a of the reaction vessel base 110a can be aligned with and in fluid communication with an extraction port 117a formed within a housing of the mixer driver 132a. Furthermore, an O-ring 134a can be disposed at the interface of the reaction vessel drain 116a of the reaction vessel 104a and the extraction port 117a of the mixer driver 132a to provide a fluid seal during operation. This design allows a drain to exit at the bottom of the reaction vessel base 110a.

A high torque mixing system is preferred inasmuch as when combining certain samples and chemical solutions, reactions occur that significantly increase viscosity. In addition, the mixing system must be sufficiently robust to completely mix bi-phase solutions within a limited diameter vessel. The mixer motor has the ability to vary speed and direction, thus enabling the magnet to break free and spin under highly viscous conditions. The mixing stir bar 130a can be magnetic, i.e., has a north and south pole, which repels or attracts relative to the poles produced by the magnetic mixer driver 132a. More specifically, the mixer driver 132a can define a torus-shaped electrical winding circumscribing the extraction port 117a and creates an alternating magnetic flux field for driving the mixing stir bar 130a about a rotational axis. The mixing stir bar 130a agitates the sample as one or more saponification fluids or solvents are added to the reaction vessel 104a.

In the described embodiment, the mixer driver 132a portion of the mixer 130a, 132a can be disposed below the reaction vessel 104a and outside the reaction chamber 100, which can form an oven when heated. As a consequence, the mixer driver 132a is unaffected by the heat of the reaction chamber 100. Additionally, the current-driven magnetic mixer driver 132a cannot produce an electrical spark in the reaction chamber 100 which may contain combustible gases as a consequence of the use of solvents, such as ethanol or hexane, in the reaction chamber 100.

The reaction vessel 104a can be disassembled into a reaction vessel column 106a and reaction vessel base 110a which allows for the placement of a reaction vessel filter 140a therebetween. The compressive force exerted by the reaction vessel cap 108a seals and secures the perimeter of the reaction vessel filter 140a, such that particulates cannot circumvent the reaction vessel filter 140a. The selective reaction vessel filter 140a is capable of filtering insoluble particulate matter from the dissolved analyte material. More specifically, the reaction vessel filter 140a separates liquids from solids when performing a vitamin analysis. Furthermore, when performing a fat analysis, the reaction vessel filter 140a quantitatively retains the lipid fractions while removing unwanted aqueous fractions to waste.

The reaction vessel filter 140a can function as a temporary valve when the reaction vessel 104a is removed from the reaction chamber 100, filled with sample material, and weighed. That is, since the reaction vessel 104a must contain a dry or wet sample while being loaded, weighed and, subsequently, reassembled into the reaction chamber 100, the reaction vessel filter 140a prevents the sample, or a portion of the sample, from escaping through the reaction vessel drain 116a. The reaction vessel filter 140a may vary in composition depending upon the chemical resistance properties and the type of analysis being performed.

For example, when performing a fat analysis on a food sample, the reaction vessel filter 140a can be fabricated from a filter media having the capacity to retain particles two microns (2 μm) and larger. Typically, the reaction vessel filter 140a will range from between approximately two microns (2 μm) to approximately fifteen microns (15 μm) when performing such analyses. When performing a vitamin analysis, the filter media of the reaction vessel filter 140a can be fabricated from a filter material having a pore size less than approximately eight microns (8 μm). Typically, the filter media of the reaction vessel filter 140a will range from between about eight microns (8 μm) to about thirty microns (30 μm). The retention of particulate when performing vitamin analyses does not need to be comprehensive. While it is important that fines do not clog fine tubing and valves, it is not critical that all fines are retained in the reaction vessel filter 140a because contrary to fat analysis, the entire saponified mixture of liquid and ultrafine particles are transferred to the purification vessel 204a. The purification vessel 204a not only retains the polar compounds but also filters out any fine particles that pass through the reaction vessel filter 140a.

Shuttle Valve

It will be appreciated that while the reaction is occurring in the reaction vessel 104a, the sample and dissolved analyte remain in the reaction chamber 104a for a prescribed period (e.g., a dwell period). In one embodiment, a timer is provided to determine a dwell time associated with the operation of, e.g., the mixer, pump, and heat source and providing a dwell signal indicative of the operating time of each.

Figure 7A:
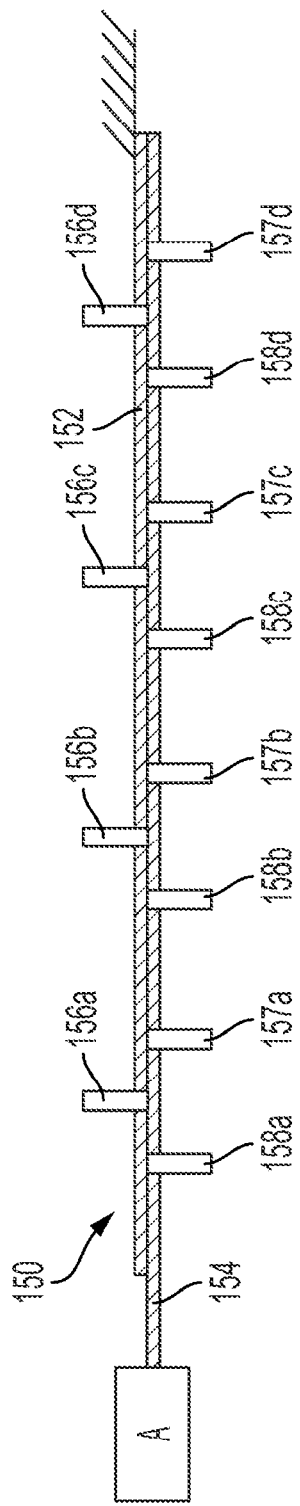
FIG. 7A depicts a sectional view taken substantially along line 7A-7A depicting the shuttle valve in a closed position.
Figure 7B:
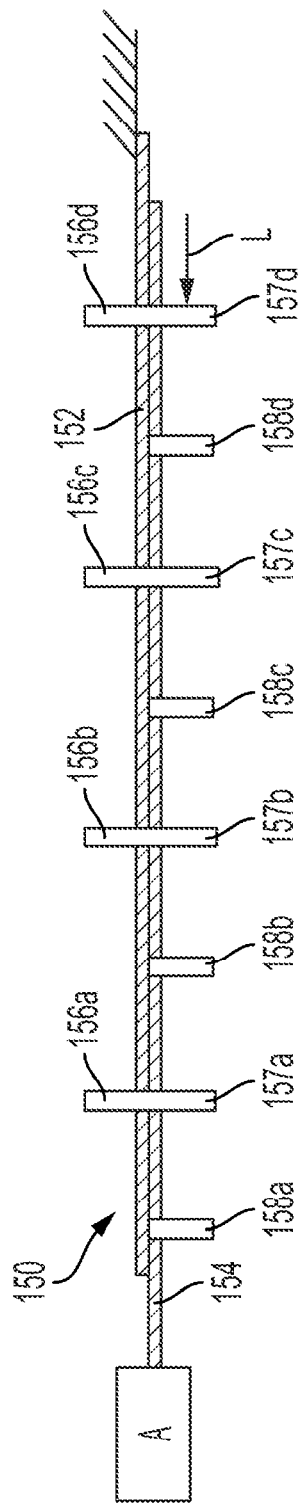
FIG. 7B depicts a sectional view taken substantially along line 7B-7B depicting the shuttle valve in an open-to-vessel position.
Figure 7C:
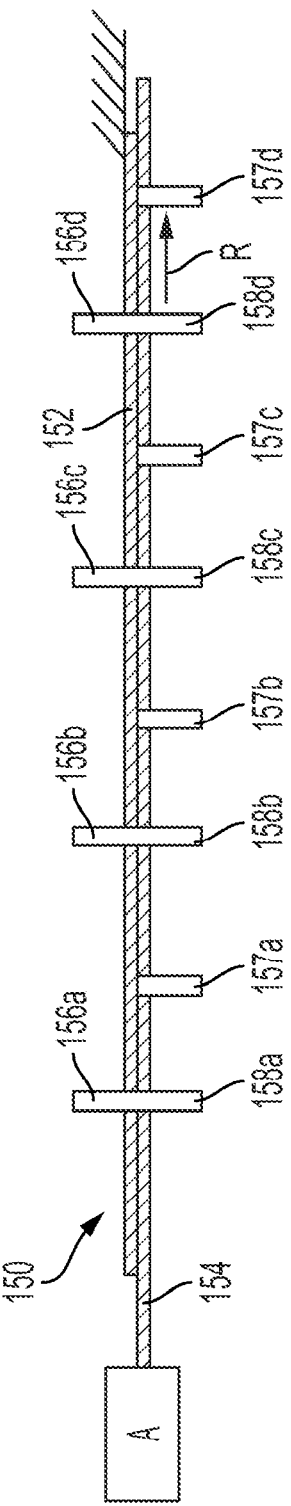
FIG. 7C is a sectional view taken substantially along line 7C-7C depicting the shuttle valve in an open-to-waste position.

In the described embodiment, this can be accomplished by a shuttle valve 150a, which prevents the gravitational flow of the dissolved analyte from the reaction vessel 104a for the prescribed dwell period. FIGS. 7A-7C depict schematic sectional views along the length and through each of the ports 156a-156d, 157a-157d, 158a-158d of the shuttle valve 150 in different configurations of the shuttle valve 150. Arrows 7A-7A, 7B-7B, 7C-7C as shown in FIG. 3 illustrate the direction of the cross-sectional plane and do not provide information concerning the kinematics of the shuttle valve operation. As will be appreciated upon review of the subsequent paragraphs, the plates 152, 154 of the shuttle valve 150 slide orthogonally relative to the direction of arrows 7A-7A, 7B-7B, 7C-7C.

In FIGS. 3 and 7A-7C, the shuttle valve 150 can comprise a pair of sliding plates, i.e., an upper or first plate 152, and a lower or second plate 154, wherein the first plate 152 includes ports 156a, 156b, 156c, 156d which are horizontally spaced in the plane of the plate 152. The plates 152, 154 are interposed between the reaction vessel drains 116a, 116b, 116c, 116d of the respective reaction vessels 104a, 104b, 104c, 104d and the input ports 202a, 202b, 202c, 202d of the respective purification vessels 204a, 204b, 204c, 204d.

Examination of configuration of the plates 152, 154 shown in FIG. 7A (closed position) reveals that the ports 156a, 156b, 156c, 156d of the first plate 152 are dead-ended or closed against the upper surface of the second plate 154. Accordingly, the shuttle valve 150 is in a closed position for inhibiting the passage of dissolved analyte from the reaction vessel drains 116a, 116b, 116c, 116d of the respective reaction vessels 104a, 104b, 104c, 104d to the input ports 202a, 202b, 202c, 202d of the respective purification vessels 204a, 204b, 204c, 204d.

Examination of configuration of the plates 152, 154 shown in FIG. 7B reveals that shuttle valve 150 is in a open-to-waste position facilitating the passage of fluid through the first and second plates 152, 154 by means of the aligned port pairs 156a, 157a, 156b, 157b, 156c, 157c, 156d, 157d in plates 152, 154, respectively. That is, the actuator A moves the relative position of the plates 152, 154 such that the ports 156a, 156b, 156c, 156d from one plate 152 align with the ports 157a, 157b, 157c, 157d of the opposing plate 154. It will be appreciated that the input ports 156a, 156b, 156c, 156d are aligned with output ports 157a, 157b, 157c, 157d located on the lower plate 154 to allow the flow of fluid from the reaction vessels 104a, 104b, 104c, 104d across the plates 152, 154 towards a drain reservoir. This can be achieved by moving the second or lower plate 154 in one direction, e.g., in the direction of arrow L to the left (FIG. 7B), while maintaining the position of the upper plate 152, i.e., held stationary. In another embodiment, the second or lower plate 154 can remain stationary while the first or upper plate 152 moves to the right. Potential uses of the drain-to-waste position are to remove solvent vapors from the reaction vessel or to remove unnecessary liquids from the reaction vessel.

Examination of configuration of the plates 152, 154 shown in FIG. 7C reveals that shuttle valve 150 is in a open-to-vessel (purification) position facilitating the passage of fluid through the first and second plates 152, 154 by means of the aligned port pairs 156a, 158a, 156b, 158b, 156c, 158c, 156d, 158d in plates 152, 154, respectively. That is, the actuator A moves the relative position of the plates 152, 154 such that the ports 156a, 156b, 156c, 156d from one plate 152 align with the output ports 158a, 158b, 158c, 158d of the opposing plate 154. It will be appreciated that the input ports 156a, 156b, 156c, 156d are aligned with output ports 158a, 158b, 158c, 158d located on the lower plate 154 to allow the flow of dissolved analyte from the reaction vessels 104a, 104b, 104c, 104d across the plates 152, 154 to the respective purification vessels 204a, 204b, 204c, 204d. This can be achieved by moving the second or lower plate 154 in one direction, e.g., in the direction of arrow R to the right (FIG. 7C), while maintaining the position of the upper plate 152, i.e., held stationary. In another embodiment, the second or lower plate 154 can remain stationary while the first or upper plate 152 moves to the left. Accordingly, the shuttle valve simultaneously controls the flow between the reaction vessels 104a, 104b, 104c, 104d and the purification vessels 204a, 204b, 204c, 204d.

The low-profile geometry of the shuttle valve 150 allows the valve 150 to be mounted below the reaction chamber 100 while remaining in close proximity to the reaction vessel drains 116a, 116b, 116c, 116d of the reaction vessels 104a, 104b, 104c, 104d. Moreover, the use of a small inner-diameter tubing to connect the reaction vessel drains 116a, 116b, 116c, 116d to the purification vessels 204a, 204b, 204c, 204d ensures a minimal air gap therebetween. This ensures that liquid does not migrate into the valve area when the reaction chamber 100 is operational. Finally, the shuttle valve 150 can be pneumatically actuated reducing the potential for electrical sparks in areas which may contain evaporated solvent and potentially flammable/combustible gases.

Purification Chamber

In the purification chamber 200, the analyte extractor 10 separates wanted fractions of the dissolved analyte from reaction vessel 104a from unwanted fractions of the dissolved analyte from reaction vessel 104a by passing the dissolved analyte through a purification vessel 204a filled with a selective sorbent 216a (e.g., a solid phase filter material, such as siliceous earth, also commonly referred to as diatomaceous earth (DE) or other chromatographic media or aluminum oxide). Before passing the dissolved analyte through the purification vessel 204, the selective sorbent can be conditioned to retain polar compounds in the purification vessel 204 while permitting the more non-polar target analytes to pass through the purification vessel 204. This can be achieved by passing a specific quantity of water and ethanol through the selective sorbent, either prior to or simultaneously with the sample.

As shown in FIGS. 1, 3, and 6, the purification chamber 200 defines a cavity for mounting four (4) purification vessels 204a, 204b, 204c, 204d which can be arranged substantially horizontally across the purification chamber 200. Continuing with the description above, a single purification vessel 204a will be described with the understanding that adjacent vessels 204b, 204c, 204d can be essentially identical and do not require or warrant additional description. Hence, when referring to one purification vessel 204a in the purification chamber 200, it should be understood that the vessel being described applies to all of the vessels in the adjacent assay stations.

The purification vessel 204a can be configured to receive the dissolved analyte from the reaction vessel 104a following the reaction and filtration of the analyte in the reaction chamber 100. More specifically, the purification vessel 204a can be in fluid communication with the reaction vessel drain 116a of the reaction vessel 104a though a shuttle valve 150.

The purification vessel 204a includes a polymer (e.g., polypropylene) cylindrically shaped purification vessel column 208a having a purification vessel drain (e.g., a tapered nozzle) 210a at one end and a top opening 212a at the other end, equivalent in size to the diameter of the purification vessel column 208a. It will be understood that the scope of the invention includes purification vessel 204a having a shape different than a cylindrical column. While, in the disclosed embodiment, the purification vessel 204a can be a polymer, it should also be understood that the purification vessel 204a could be any flexible or rigid single use container.

The purification vessel column 208a can be configured to receive: (i) lower purification vessel filter 214a for being disposed above the purification vessel drain 210a, (ii) a volume of a selective sorbent (e.g., siliceous earth (SE)) 216a, (iii) a purification vessel diffuser 218a, and (iv) a purification vessel cap (i.e., lid, plug, top, etc.) 220a for controlling the flow of dissolved analyte and nitrogen into the purification vessel column 208a. The lower purification vessel filter 214a and purification vessel diffuser 218a are employed to hold the selective sorbent 216a without allowing any of the filter material through the purification vessel filter 214a or the purification vessel diffuser 218a. The pores of the lower purification vessel filter 214a and the purification vessel diffuser 218a must be sufficiently small to hold the selective sorbent material.

The dissolved analyte from the reaction vessel 104a enters the purification vessel column 208a via the reaction vessel cap apertures 224a in the purification vessel cap 220a. In one embodiment and as shown in FIG. 3, an input port 202a can feed the mixture from the reaction vessel drain 116a to the purification vessel cap 220a of the purification vessel column 208a. Once through the reaction vessel cap aperture 224a, the purification vessel diffuser 218a diffuses or spreads the analyte solution to prevent the formation of flow channels, (similar to erosion caused by running water) through the selective sorbent 216a. As such the analyte material is spread in a substantially uniform manner over the top of the selective sorbent 216a. Once the dissolved analyte from the reaction vessel 104a is passed through the purification vessel 204a, the purified analyte contained in solvent flows serially through the purification vessel drain 210a to one or more containers (e.g., flasks) 304a, 304b, 304c, 304d in the evaporation chamber 300.

Evaporation Chamber to Evaporate Liquids from the Purified Analyte Material

In the evaporation chamber 300, the solvent can be evaporated from the purified analyte such that the purified analyte may be collected for subsequent quantitation (e.g., by HPLC or GC). In FIG. 4, the evaporation container (e.g., flask) 304a is in fluid communication with, and receives, the purified analyte material from the purification vessel 204a, i.e., from the purification vessel drain 210a. It will be understood that the scope of the invention includes evaporation containers 304a having a shape different than a flask. The purified analyte mixture contains solvents which are evaporated in an oxygen free environment within the evaporation container 304a. That is, the evaporation container 304a can be filled with the inert gas (e.g., nitrogen $N_2$) via a nozzle 308a. The nozzle 308a can be disposed in combination with a cap (not shown) inserted within the opening of the evaporation container 304a, while an exhaust aperture in the cap (not shown) allows the high velocity flow of inert nitrogen gas ($N_2$) to move the solvent within the container 304a and promote evaporation.

In addition to movement of the solvent within the evaporation container 304a, the evaporation container 304a can be heated to increase the rate of evaporation. The container 304a can be continuously purged with nitrogen to protect the analyte from oxidation. To protect light sensitive analytes from select wavelengths of ultraviolet light, UV protected polycarbonate doors can cover chambers 100 and 300.

In FIGS. 2 and 4, the ducting from the heater H can be bifurcated such that a flow of heated air can be directed to both the reaction vessel 104a in the reaction chamber 100 and the evaporation container 304a in the evaporation chamber 300. Temperature sensors T1, T2, ST, located in the reaction and evaporation chambers 100, 300, provide temperature signals to the processor 20. These signals are indicative of the instantaneous temperatures within each of the chambers 100, 300 and within each of the reaction vessels 104a, 104b, 104c, 104d and each of the evaporation containers 304a, 304b, 304c, and 304d. The processor 20 can compare these signals to predefined temperature values stored in processor memory. The processor 20 evaluates the difference or error signal between the stored temperature value and the actual/instantaneous temperature to raise or lower the temperature in the respective chambers 100, 300 and/or reaction vessels 104a, 104b, 104c, 104d and evaporation containers 304a, 304b, 304c, and 304d.

Temperature sensors T1, T2, and ST can be located in various locations within the analyte extractor 10 for the purpose of mapping the temperature in the reaction and evaporation chambers 100, 300. With respect to the reaction chamber 100, the described embodiment shows a temperature sensor T1 to determine the temperature within the chamber 100 while temperature sensor ST measures the temperature in each of the upper end caps to obtain a temperature reading from within each of the reaction vessels 104a, 104b, 104c, 104d. While these locations provide a reasonably accurate picture of the temperature within the reaction chamber 100 and within the vessels 104a, 104b, 104c, 104d, it will be understood that other locations may provide more direct or accurate temperature measurements.

For example, in one alternate embodiment, a thermocouple can be attached to the reaction vessel column 106a of each of the vessels 104a, 104b, 104c, 104d such that the temperature of the sample mixture can be measured within the respective vessels 104a, 104b, 104c, 104d. This may be done assuming, of course, that the borosilicate glass has a sufficiently low R (resistivity) value and does not function as an insulator. In yet another embodiment, a temperature sensor or thermocouple may be integrated within the plastic reaction vessel base 110a of each of the vessels 104a, 104b, 104c, 104d such that temperature can be measured at the bottom of the respective vessels 104a, 104b, 104c, 104d.

The fluid reservoirs $R_{L1}$, $R_{L2}$, $R_{L3}$, $R_{L4}$ may contain one or more strong basic or acidic fluids, such as potassium hydroxide (KOH) or hydrochloric acid (HCl). Alternatively, the reservoirs $R_{L1}$, $R_{L2}$, $R_{L3}$, $R_{L4}$ may contain one or more solvents including, water ($H_2O$), ethanol ($CH_3CH_2OH$) and hexane ($CH_3(CH_2)_4CH_3$). Flow from the reservoirs $R_{L1}$, $R_{L2}$, $R_{L3}$, $R_{L4}$, and/or from the nitrogen supply may be supplied or activated by the external pumps P and/or controlled by one or more valves V and/or flow meters M. In addition to the apertures 112a for accommodating fluid or gaseous flow, the reaction vessel cap 108a may include at least one aperture for accepting pressure sensor SP.

The processor or controller 20 can be responsive to the temperature, pressure, and liquid sensor signals ST, SP, SL provided by each of these sensors for changing the temperature, pressure, and flow within the reaction chamber 100, purification chamber 200, and evaporation chamber 300. With respect to the temperature in the reaction chamber 100, an alternate or second temperature sensor T1 (see FIG. 2) may be disposed in the reaction chamber 100 rather than through the reaction vessel cap 108a of the reaction vessel 104a. The temperature in the reaction chamber 100 may be varied by controlling the output of the heater H and the blower B. Accordingly, the processor 20 can be responsive to temperature signals from one or more temperature sensors.

Temperature sensor T1 can vary or change the output of the heat source H along with the flow of the blower B. In one embodiment, a heat exchanger can be connected to the heater H and the blower can direct air over the heat exchanger to create heated air. It will be appreciated that the flow of heated air can be bifurcated such that while performing or causing the reaction, some or all of the heated flow Hs can be directed to the reaction chamber 100 and, during evaporation of the liquid(s) contained in the sample, some or all of the flow HE can be directed to the evaporation chamber 300. Consequently, the processor 20 may direct the flow from the heater H to either of chambers 100, 300 via a bifurcated duct (BD). The processor 20 may be responsive to the pressure signals to increase the pressure of the nitrogen gas ($N_2$) during the reaction to improve or increase the flow rate through of the reaction vessel drain 116a. This can also serve as a method to inject nitrogen gas ($N_2$) into the subsequent purification chamber 200, following the reaction in the reaction chamber 100.

Designing an automated system and method was a complex endeavor involving a series of inventive steps that were not obvious at the start of the project. A number of significant difficulties and challenges were overcome to develop an instrument that performed automatically.

The reactions necessary to chemically release the analyte produces a reaction mixture that is not always compatible with the next process. For example, the requirements for conditioning a SPE (solid phase extraction) column are not typically compatible with a reaction mixture designed to chemically release the analyte. The passage of the analyte from the reaction chamber, with both solid and liquid fractions, was not compatible with a valve function necessary to transfer the analyte to the next step. The solution was to carry out the reaction prior to, or above, filtration so that only the liquid would pass through under certain conditions. It was then discovered that changes to the reaction and a specialized filtration design was required. More specifically, unique filter designs, special mixing configurations and changes in solutions were required.

For example, the solution that passed through the filter contained a complex mixture of the analyte and contaminants in an aqueous and organic solvent solution. In order to isolate the analyte, an SPE column was employed. The stationary phase of the SPE was capable of retaining the contaminants, water and other polar solvents, while allowing the non-polar solvents (e.g., hexane) to elute the analyte for transfer to the evaporation chamber. The resulting system included a reaction vessel having a bottom portion configured to be detachably released to facilitate filter removal/replacement and sample introduction. Furthermore, the valve system was developed that facilitated transfer of solution to the next chamber or to waste. Finally, an SPE column was employed for purification, which communicated with a flask in an evaporation chamber that removed the solvent by nitrogen gas together with a directed heat input.

Examples of Analyte Extraction
Vitamins

The analyte extractor 10 of the present disclosure is capable of extracting analytes from complex matrices. One example is that of the extraction of vitamins A and E from infant formula. Infant formula can be reconstituted with water, after which a sub-sample (aliquot) is weighed in the reaction vessels 104a, 104b, 104c and 104d, along with a combination of antioxidants. Each of the reaction vessels 104a, 104b, 104c and 104d can be subsequently assembled into the reaction chamber 100. The reaction vessel cap 108a, 108b, 108c, 108d for each can be combined with the respective reaction vessel 104a, 104b, 104c, 104d (i.e., effecting a fluid-tight seal with each of the reaction vessels 104a, 104b, 104c, 104d via the downward force applied by the mounting bracket) once the reaction vessels 104a, 104b, 104c, 104d is placed on the instrument 10. The following processes are automatically controlled by the processor 20: addition of saponification solutions (KOH and ethanol), mixing and heating to 75° C. for 30 minutes, the addition of water, cooling to 60° C., passing the reaction mixture through the filter and allowing the liquid to pass into the SPE column containing diatomaceous earth, eluting vitamin A and E from the SPE column with hexane (leaving the contaminants behind) and passing vitamins into the round bottom flasks in the evaporation chamber 300, the solvent is then evaporated by a vigorous flow of nitrogen and a heat source focused on the bottom of the flask. The isolated oils containing vitamins A and E are manually re-dissolved in hexane and injected into an HPLC for quantitation.

Total Fat Analysis

Another example is that of total fat analysis, through acid hydrolysis. The analyte extractor 10 recovers total fat by combining the digestion (HCl) and extraction processes in the reaction chamber 100 with the separation capabilities of SPE. Ethanol can be used to displace the residual water and bridge the polarity gap with hexane, allowing the hexane to penetrate the sample residue and filter, ultimately dissolving the fat. The constant agitation coupled with heated solvent greatly enhances extraction ability. The SPE column binds the aqueous/ethanolic solvent and components and allows the hexane to elute with the fat. This selective capability of the SPE allows the analyte extractor 10 to bypass the traditional drying step of the hydrolyzed sample such that the total fat analysis can be performed in a single device/instrument.

The steps involved for analysis of total fat begins with sample breakdown in the reaction vessel 104a. Before the sample is added, the selective, multi-layered reaction vessel filter 140a can be placed in the reaction vessel 104a over the reaction vessel drain 116a. The reaction vessel filter 140a comprises a combination of rigid and flexible layers which provide structural and loft benefits. Loft prevents the sample from clogging the filter during filtration, while the rigidity of the reaction vessel filter 140a prevents it from moving under the reaction vessel column 106a. The sample can be then added and reassembled into the mounting bracket within the reaction chamber 100. In a total fat analysis, hydrochloric acid (HCl) can be contained in one of the reservoirs $R_{L2}$, $R_{L3}$, $R_{L4}$ and can be automatically added into the reaction vessel 104a.

Enhanced by continuous mixing, the sample can be heated in the HCl solution to release the bound fat. Once the process is complete, the aqueous solution can be filtered to waste through the shuttle valve 150. By mixing and heating the sample in the reaction chamber 100, chemical breakdown of the sample can be optimized, and fat completely released from the sample matrix. The chemical breakdown also reduces the formation of gelatinous materials which can clog a filter. Inasmuch as the chemical bonds are broken and contaminants are removed, the analyte extractor 10 can filter large samples through a relatively small filter allowing only the aqueous solution to pass.

The analyte extractor 10 bypasses the drying step by the integration of the SPE column. Rather than drying the sample, as discussed in the Background section of this disclosure, the analyte extractor 10 automatically adds solvents (e.g., ethanol and hexane) to the sample residue remaining on the reaction vessel filter 140*a*. The hydrophilic nature of the ethanol combines with the water to make a new solvent that can be compatible with the hexane enabling the hexane to extract the fat. After extracting the wet residue with solvent, the extracted solvent contains a dissolved mixture of medium-polarity substances along with the fat.

Therefore, the fat must be isolated from the nonfat components. In the present disclosure, this step can be performed by the SPE column, where polar and medium polar contaminants are separated from the non-polar, fat components. Furthermore, the SPE column interacts with the mixed sample solution allowing only non-polar solvents containing fat to exit the SPE column into the evaporation flask. Once the solvent and fat have entered the evaporation flask, the solvent is evaporated leaving only fat behind for further analysis.

The analyte extractor 10 is unique by comparison to other total fat analysis methods. For example, the analyte extractor 10 can perform total fat analyses with a single instrument which does not require a separate drying step. This differentiates the analyte extractor 10 from other extraction methods, which require the combination of at least two instruments and an oven drying step to accomplish total fat analysis.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

The invention claimed is:

1. A system for extracting an analyte from a sample, the system comprising:
    a reaction chamber comprising:
        a reaction vessel configured to receive and mix the sample with a reaction solution to produce a reaction mixture, the reaction vessel including:
            a filter configured to retain insoluble components contained within the reaction mixture while passing soluble components of the reaction mixture; and
            a reaction vessel drain configured to dispense the soluble components from the reaction mixture and a dissolved analyte from the reaction vessel;
    a purification chamber comprising:
        a purification vessel column configured to receive the soluble components from the reaction mixture and the dissolved analyte from the reaction vessel drain, the purification vessel column including:
            a selective sorbent disposed in the purification vessel configured to retain contaminants from the soluble components of the reaction mixture and passing a purified analyte; and
            a purification vessel drain for dispensing the purified analyte from the purification vessel; and
    an evaporation chamber comprising:
        an evaporation vessel configured to receive the purified analyte from the purification vessel drain; and
        a heater configured to evaporate a solvent from the purified analyte.

2. The system of claim 1, wherein the reaction vessel, the purification vessel, and the evaporation vessel are vertically aligned along an axis.

3. The system of claim 1, wherein the reaction vessel further comprises a mixer comprising a stir bar and a magnetic driver configured to create a magnetic flux field for driving the stir bar about an axis.

4. The system of claim 1, wherein the purification vessel further comprises a diffuser for diffusing the soluble components from the reaction mixture, including the dissolved analyte, received from the reaction vessel.

5. The system of claim 1, wherein the purification vessel further comprises a selective sorbent composed from a solid phase filter material.

6. The system of claim 5, wherein the solid phase filter material is selected from the group consisting of siliceous earth or diatomaceous earth.

7. The system of claim 1, further comprising a blower for blowing a heated gas into one of the evaporation and reaction chambers.

8. A system for extracting an analyte from a sample, the system comprising:
    a reaction chamber comprising a reaction vessel configured to receive the sample with a reaction solution, separate insoluble components from a reaction mixture and dispense soluble components, including a dissolved analyte, from the reaction mixture;
    a purification chamber comprising a purification vessel configured to receive the soluble components, including the dissolved analyte, from the reaction vessel, separate contaminants from the soluble components and dispense a purified analyte from the purification vessel; and
    an evaporation chamber comprising an evaporation vessel configured to receive the purified analyte from the purification vessel.

9. The system of claim 8, further comprising:
    a heater configured to evaporate a solvent from the purified analyte.

10. The system of claim 9, wherein the reaction vessel, the purification vessel, and the evaporation vessel are vertically aligned along an axis.

11. The system of claim 9, wherein the reaction vessel further comprises a mixer comprising a stir bar and a magnetic driver configured to create a magnetic flux field for driving the stir bar about an axis.

12. The system of claim 9, wherein the reaction vessel is detachable.

13. The system of claim 9, wherein the purification vessel is detachable.

14. The system of claim 9, wherein the purification vessel further comprises a selective sorbent composed from a solid phase filter material.

15. The system of claim 14, wherein the solid phase filter material is selected from the group consisting of siliceous earth or diatomaceous earth.

16. The system of claim 9, further comprising a blower for blowing a heated gas into one of the evaporation and reaction chambers.

17. A method for extracting an analyte from a sample, the method comprising the steps of:
- mixing the sample with a reaction solution in a reaction vessel to produce a reaction mixture,
- separating insoluble components from the reaction mixture;
- dispensing soluble components, including a dissolved analyte, from the reaction mixture,
- receiving the soluble components, including the dissolved analyte, into a purification vessel;
- separating contaminants from the soluble components; and
- dispensing a purified analyte of the soluble component from the purification vessel into an evaporation vessel.

18. The method of claim 17 further comprising the step of:
- heating the purified analyte to evaporate a solvent from the evaporation vessel.

19. The method of claim 17 further comprising the step of:
- aligning the reaction, purification and evaporation vessels along an axis to allow gravity assisted flow from one vessel to another vessel.

20. The method of claim 17 further comprising the step of:
- blowing a heated gas into one of the reaction, purification and evaporation vessels.

* * * * *